US012688139B2

(12) United States Patent
Durham et al.

(10) Patent No.: US 12,688,139 B2
(45) Date of Patent: Jul. 21, 2026

(54) IDENTIFICATION OF OPTION CARDS USING MULTIPLE VOLTAGE INPUTS

(71) Applicant: Hewlett-Packard Development Company, L.P., Spring, TX (US)

(72) Inventors: Michael Richard Durham, Spring, TX (US); Mark Andrew Piwonka, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 11 days.

(21) Appl. No.: 18/565,950

(22) PCT Filed: Jun. 28, 2021

(86) PCT No.: PCT/US2021/039441
§ 371 (c)(1),
(2) Date: Nov. 30, 2023

(87) PCT Pub. No.: WO2023/277865
PCT Pub. Date: Jan. 5, 2023

(65) Prior Publication Data
US 2024/0264966 A1      Aug. 8, 2024

(51) Int. Cl.
*G06F 13/40*        (2006.01)
*G06F 1/3212*      (2019.01)

(52) U.S. Cl.
CPC ........ *G06F 13/4068* (2013.01); *G06F 1/3212* (2013.01)

(58) Field of Classification Search
CPC ................................................. G06F 13/4068

USPC ......................................................... 710/301
See application file for complete search history.

(56) References Cited

U.S. PATENT DOCUMENTS

| | | | | |
|---|---|---|---|---|
| 6,149,319 A | * | 11/2000 | Richter | ................ H10D 84/998 |
| | | | | 713/340 |
| 6,456,139 B1 | * | 9/2002 | Pelissier | ........ H03K 19/017581 |
| | | | | 327/519 |
| RE48,418 E | * | 2/2021 | Fujimoto | ................. G06F 1/266 |
| 2005/0066102 A1 | * | 3/2005 | Yamamoto | ............ G06F 13/387 |
| | | | | 710/301 |
| 2007/0134960 A1 | * | 6/2007 | Mizoguchi | ............. B41J 29/393 |
| | | | | 439/159 |
| 2009/0198841 A1 | * | 8/2009 | Yoshida | .............. G06F 13/4295 |
| | | | | 710/16 |
| 2010/0125689 A1 | * | 5/2010 | Chang | ................... G06F 13/387 |
| | | | | 710/301 |
| 2010/0138580 A1 | | 6/2010 | Asfur | |

(Continued)

FOREIGN PATENT DOCUMENTS

| | | | | |
|---|---|---|---|---|
| JP | 2008-084340 A | | 4/2008 | |
| WO | WO-2020134035 A1 | * | 7/2020 | ......... G06K 19/0722 |

*Primary Examiner* — Titus Wong
(74) *Attorney, Agent, or Firm* — Quarles & Brady LLP

(57) ABSTRACT

An example computing device includes: an option card receptacle to receive an option card; a controller interconnected with the option card receptacle, the controller to: apply a first voltage input to the option card in the option card receptacle and detect a first output from the option card; apply a second voltage input to the option card in the option card receptacle and detect a second output from the option card; determine an identifier of the option card based on a combination of the first output and the second output.

10 Claims, 5 Drawing Sheets

(56)             References Cited

U.S. PATENT DOCUMENTS

| | | | |
|---|---|---|---|
| 2011/0252249 A1* | 10/2011 | Wang | G06F 1/26 |
| | | | 713/300 |
| 2013/0336067 A1* | 12/2013 | Tanaka | G06F 1/3225 |
| | | | 365/185.18 |
| 2014/0156884 A1* | 6/2014 | Terlizzi | G06F 13/385 |
| | | | 710/63 |
| 2015/0089261 A1* | 3/2015 | Segawa | G06F 1/324 |
| | | | 713/323 |
| 2016/0232392 A1* | 8/2016 | Soule, III | G06F 8/63 |
| 2018/0060261 A1* | 3/2018 | Chhor | G06F 13/4282 |
| 2019/0179573 A1* | 6/2019 | Hsu | G06F 9/3879 |
| 2019/0341786 A1* | 11/2019 | Lee | H02J 7/00304 |
| 2019/0372871 A1* | 12/2019 | Varshney | H04W 52/0225 |
| 2022/0283976 A1* | 9/2022 | Long | G06F 1/3215 |
| 2023/0016542 A1* | 1/2023 | Long | G06F 13/4022 |

* cited by examiner

IDENTIFICATION OF OPTION CARDS USING MULTIPLE VOLTAGE INPUTS

BACKGROUND

A variety of option cards may be used in computing devices to provide the computing device with additional functionality, such as additional input port types, graphics capabilities, and similar. The computing devices may use one of the pins of the option card to identify the option card to correctly configure the option card.

DETAILED DESCRIPTION

Option cards communicate their identity via one of their pins by outputting a voltage in a predefined range, or a voltage step with a magnitude within a predefined range. For example, one pin may support up to 16 predefined ranges (15 active ranges and a zero or no-option card range), and hence up to 16 identifiers. However, as the number of options grows, the number of identifiers also increases. If more than 16 identifiers are employed, it may be inefficient to use another pin to increase the number of identifiers possible for the option card. Additionally, adding another identification pin may lead to incompatibility with older cards.

An example computing device may identify option cards using multiple power state inputs. That is, the computing device may apply a first voltage input to the option card and receive a corresponding first output from the option card. The computing device may additionally apply a second voltage input to the option card and receive a corresponding second output from the option card. In particular, the first and second voltage inputs may correspond to different power states of the computing device. The computing device may use the combination of the first output and the second output to determine the identifier of the option card.

In particular, to enable such a determination, the option cards themselves may include a circuit which provides a first output in response to the first voltage input and a second output in response to the second voltage input. For example, the option cards may include a circuit having two resistors forming a resistor divider, as well as a third resistor which is conditionally added in series and forms part of the resistor divider based in the input voltage. Hence, at a first input voltage, the resistor divider does not include the third resistor and results in a first output, and at the second input voltage, the resistor divider includes the third resistor and results in a second output. Since the additional resistor is added to the resistor divider, the combination of two different active ranges may only be achieved in one way, and hence the option cards may provide 15 choose 2 (15 active ranges, of which two are selected), or 105 active range combinations, as well as a zero or no-option card range, for a total of 106 possible identifiers.

Figure 1:
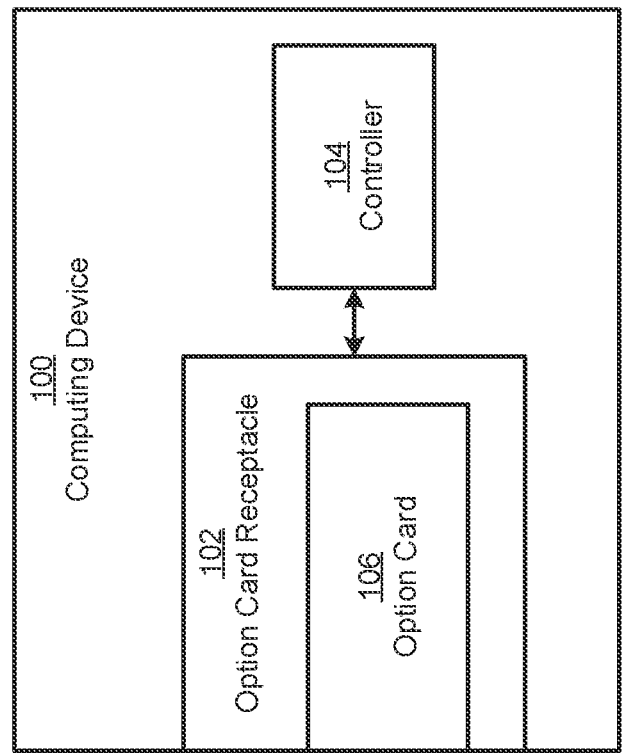
FIG. 1 is a block diagram of an example computing device which identifies option cards using multiple voltage inputs.

FIG. 1 shows a block diagram of an example computing device 100 which identifies option cards based on multiple power state inputs. The computing device 100 may be a desktop computer, a notebook or laptop computer, an all-in-one (AIO) computing device, or other suitable computing device. The computing device 100 includes an option card receptacle 102 and a controller 104 interconnected with the option card receptacle.

The option card receptacle 102 is to receive an option card 106. For example, the option card receptacle 102 may be a slot on a motherboard (not shown) of the computing device 100. In some examples, the option card receptacle 102 may further include an aperture or the like in a housing of the computing device 100, for example to accommodate an external interface of the option card (e.g., a port or the like). The option card receptacle 102 may further include pin interfaces to interface with the pins of the option card 106.

The controller 104 may include a central processing unit (CPU), a microcontroller, a microprocessor, a processing core, or similar device capable of executing instructions. In particular, the controller 104 may be a chip or integrated circuit integrated on the motherboard of the computing device. The controller 104 may also be interconnected with a non-transitory machine-readable storage medium, such as a memory, that may be electronic, magnetic, optical, or other physical storage device that stores executable instructions. The memory may be integrated with the controller 104.

The controller 104 is generally to apply voltage inputs to the option card 106 and to obtain output values from the option card 106. In particular, the option card receptacle 102 may include an input interface to input a voltage input to the option card 106 and an output interface to read the outputs from the option card 106. The output interface may be an analog-to-digital pin (e.g., associated with the controller 104) which is capable of receiving an analog output from the option card 106 and converting the analog output to a digital value for processing by the controller 104. Accordingly, the controller 104 may control the voltage inputs applied at the input interface to the option card. Additionally, the controller 104 may analyze the outputs received from the option card 106 to determine an identifier of the option card.

Figure 2:
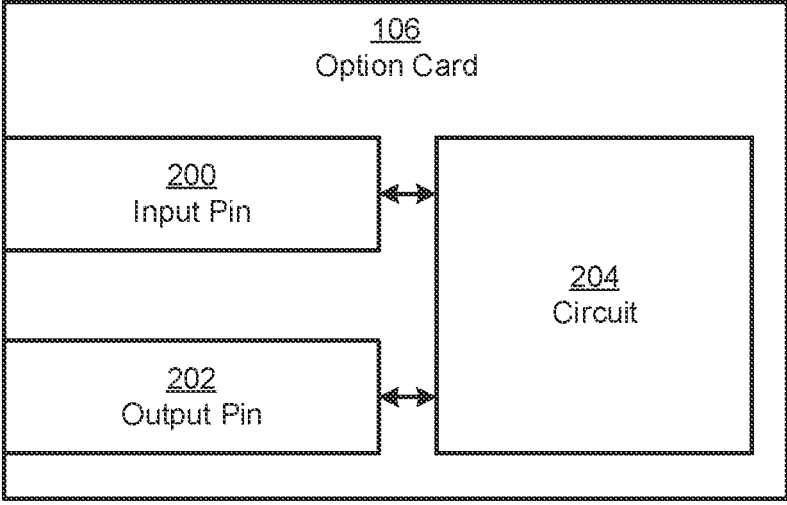
FIG. 2 is a block diagram of an example option card which can be identified using multiple voltage inputs.

Turning now to FIG. 2, a block diagram of the example option card 106 is depicted. The option card 106 includes an input pin 200 to receive a voltage input from the computing device 100, an output pin 202 to provide an output to the computing device 100, and a circuit 204 connected to the input pin 200 and to the output pin 202.

The input pin 200 may be a suitable pin which may receive a voltage input from the computing device 100 to be applied to the circuit 204. The output pin 202 be a suitable pin to receive a voltage output from the circuit 204 and provide the voltage to the computing device 100.

The circuit 204 includes suitable components (e.g., including resistors, switches, field-effect transistors, and the like) to conditionally produce at least different first and second outputs based on the voltage input received from the input pin 200. In other words, the circuit 204 produces a first output when a first voltage input is applied to the circuit 204, and a second output when a second voltage input is applied to the circuit 204.

In operation, when the option card 106 is received in the option card receptacle 102, the controller 104 may apply a first voltage input to the option card 106 via the input interface and the input pin 200. In particular, the first voltage input may correspond to a first power state (e.g., a sleep or low-power state). The controller 104 may further detect a first output from the option card 106 via the output pin 202 and the output interface of the option card receptacle 102. When the computing device 100 transitions to a second power state (e.g., a power on state), the controller 104 may apply a second voltage input to the option card 106, via the input interface and the input pin 200. The second voltage input may correspond to the second power state. The controller 104 may further detect a second output from the option card 106 via the output pin 202 and the output interface. The controller 104 may then determine an identifier of the option card based on a combination of the first output and the second output.

Figure 3:
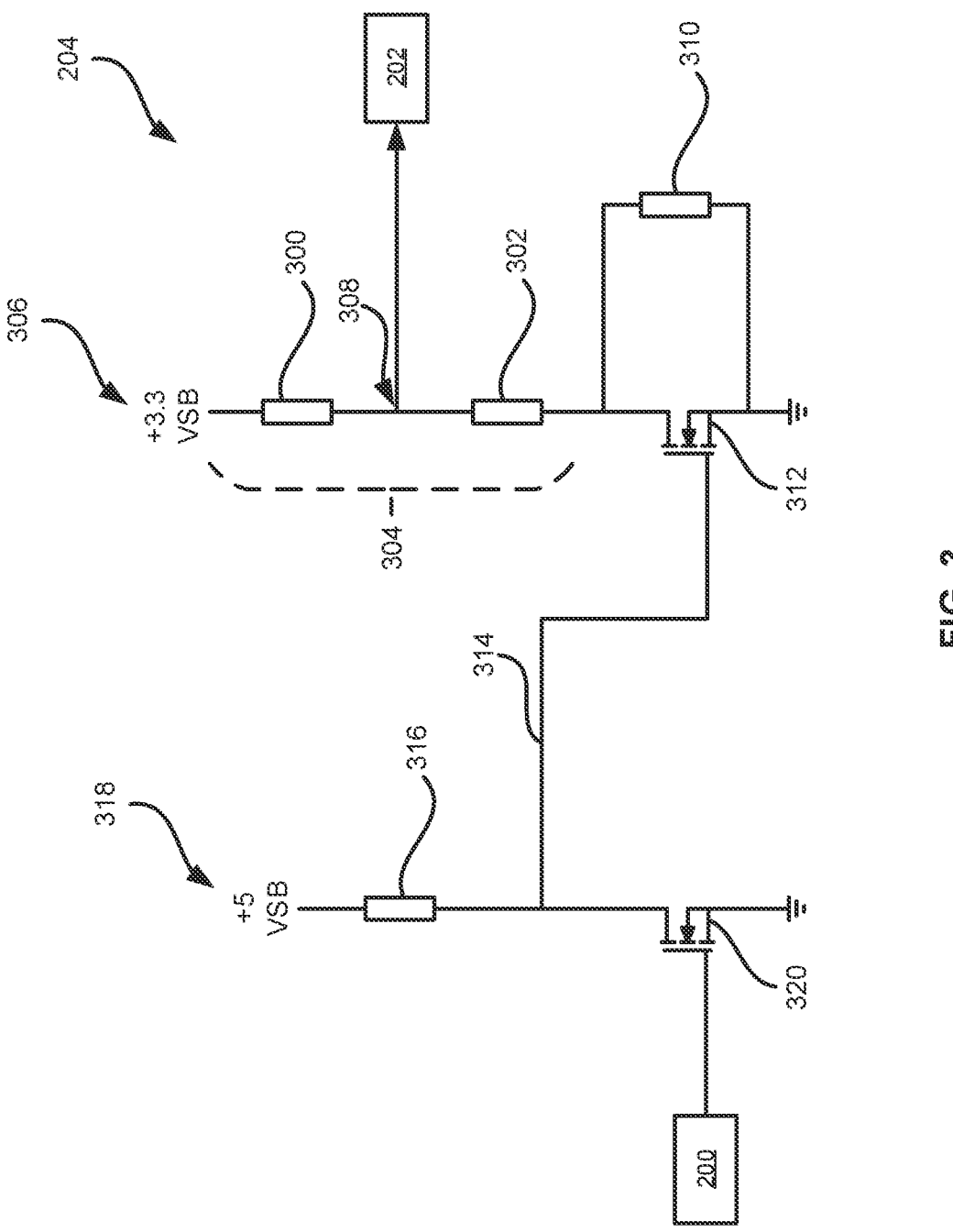
FIG. 3 is a schematic diagram of a circuit of the example option card of FIG. 2 which conditionally provides different outputs based on the voltage input.

For example, FIG. 3 is a schematic diagram of an example circuit 204 which conditionally produces different first and second outputs based on the voltage input received.

The circuit 204 includes a first resistor 300 having a resistance $R_1$ and a second resistor 302 $R_2$ forming a resistor divider 304 extending from a first source 306. The circuit 204 further includes an output point 308 between the first resistor 300 and the second resistor 302 which provides the output used to determine the identifier of the option card 106. That is, the voltage reading at the output point 308 defines the identifier of the option card 106. Accordingly, the output point 308 is connected to the output pin 202 to provide the output to the computing device 100.

The circuit 204 further includes a third resistor 310 having a resistance $R_3$ which is conditionally included in the resistor divider 304 based on the voltage input. In particular, the third resistor 310 is provided in parallel with a metal-oxide-semiconductor field effect transistor 312 (simply referred to herein as transistor 312) to enable the conditional inclusion of the third resistor 308 in the resistor divider 304. The transistor 312 is fed by a line 314 between a fourth resistor 316 extending from a second source 318 and a second metal-oxide-semiconductor field effect transistor 320, and the second transistor 320 is fed by the input pin 200 of the option card 106 and receives voltage inputs from the computing device 100.

In other examples, the circuit 204 may include the first transistor 312 and third resistor 310 to produce the conditional outputs. In other words, the second transistor 320 and second source 318 may be optional to invert the signal received from the input pin 200, as will be described further below.

Figure 4A:
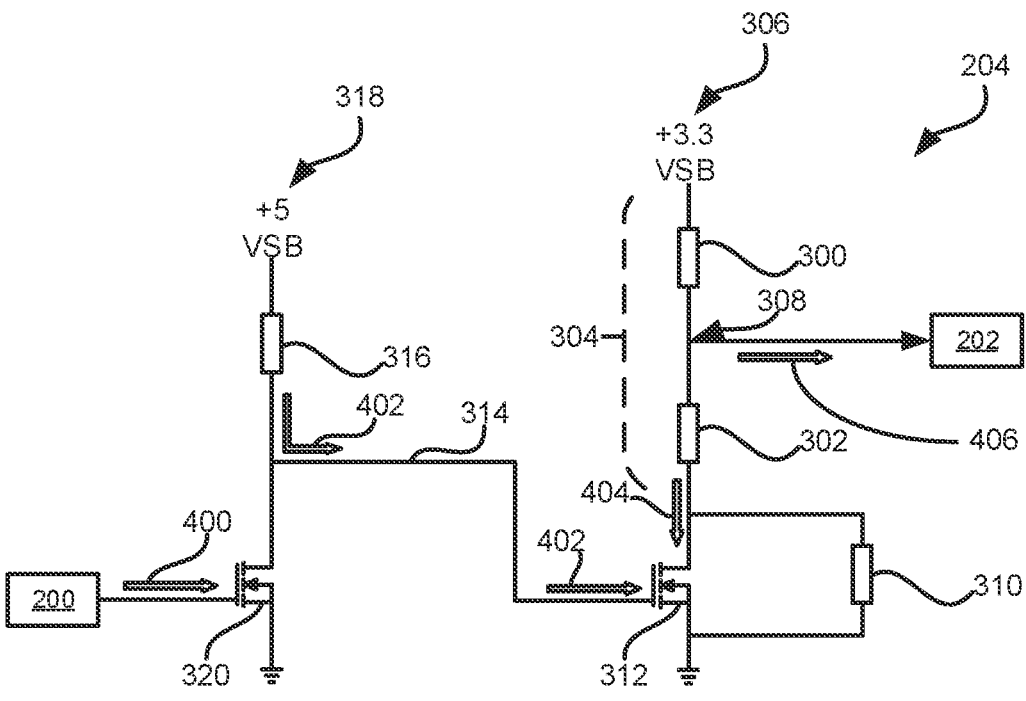
FIGS. 4A and 4B are schematic diagrams of voltages applied in the circuit of FIG. 3 upon application of different voltage inputs.

For example, referring to FIG. 4A, a schematic diagram of the voltages applied in the circuit 204 upon application of a first voltage input 400 is depicted. In particular, the first voltage input 400 corresponds to the signal generated by the computing device 100 in the first power state, or sleep state. Accordingly, the first voltage input 400 has a relatively low voltage. In response to the low first voltage input 400, the second transistor 320 provides a high resistance. Accordingly, a voltage 402 applied by the second source 318 through the fourth resistor 316 is directed primarily to the line 314. The line 314 thus applies a relatively high voltage input 402 to the first transistor 312. In other words, the transistor 320 effectively serves to invert the signal received from the computing device 100, while the fourth resistor 316 stabilizes the signal from the second source 318.

In response to the relatively high voltage 402 applied, the first transistor 312 provides a low resistance. Accordingly, a voltage 404 applied by the first source 306 is substantially shorted through the transistor 312 rather than being routed through the third resistor 310. The voltage 406 at the output point 308, is therefore defined by the ratio of the resistance of the first resistor 300 to the resistance of the second resistor 302, i.e., $R_1/R_2$. Hence, the first output corresponding to the first power state (i.e., the sleep state) is also defined by the ratio $R_1/R_2$.

Figure 4B:
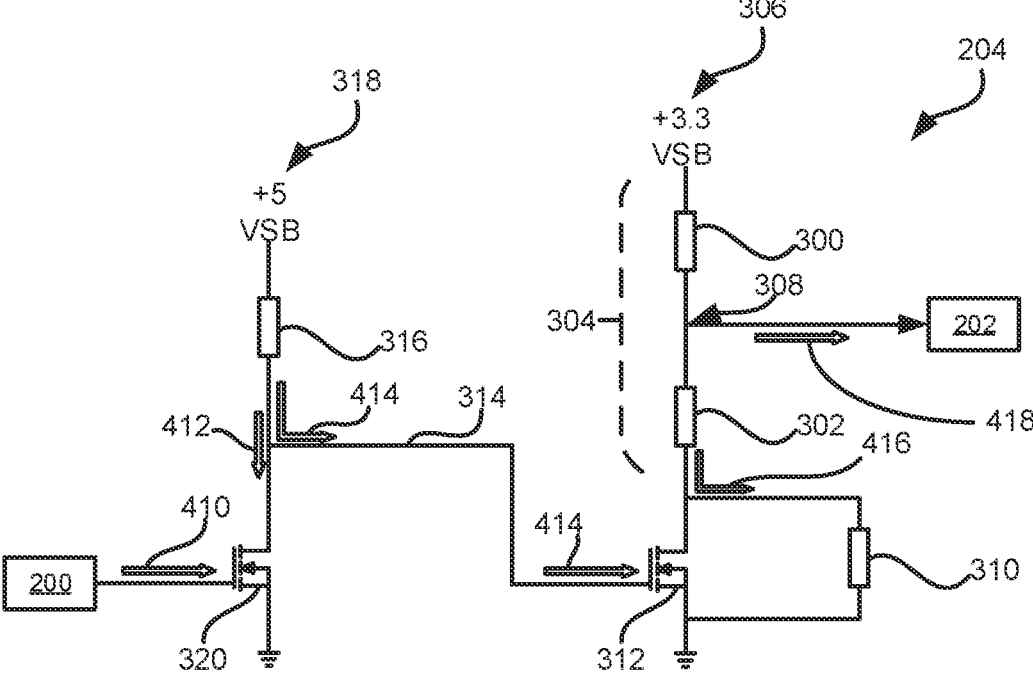

Referring to FIG. 4B, a schematic diagram of the voltages applied in the circuit 204 upon application of a second voltage input 410 is depicted. In particular, the second voltage input 410 corresponds to the signal generated by the computing device 100 in the second power state, or power-on state (S0). Accordingly, the second voltage input 410 has a relatively high voltage. In response to the high voltage input 410, the second transistor 320 provides a low resistance. Accordingly, a voltage 412 applied from the second source 318 through the fourth resistor 316 is directed primarily through the transistor 320. A relatively low voltage 414 is therefore directed through the line 314 to the first transistor 312. The transistor 320 therefore still serves to invert the signal received from the computing device 100, while the fourth resistor 316 stabilizes the signal from the second source 318.

In response to the relatively low voltage 414 applied, the first transistor 312 provides a high resistance. Accordingly, a voltage 416 applied by the first source 306 is directed through the third resistor 310. The voltage 418 at the output point 308 is therefore defined by the ratio of the resistance of the first resistor 300 to the sum of the resistances of the second resistor 302 and the third resistor 310, i.e., $R_1/(R_2+R_3)$. Hence, the second output corresponding to the second power state (i.e., the power-on state) is also defined by the ratio $R_1/(R_2+R_3)$.

Figure 5:
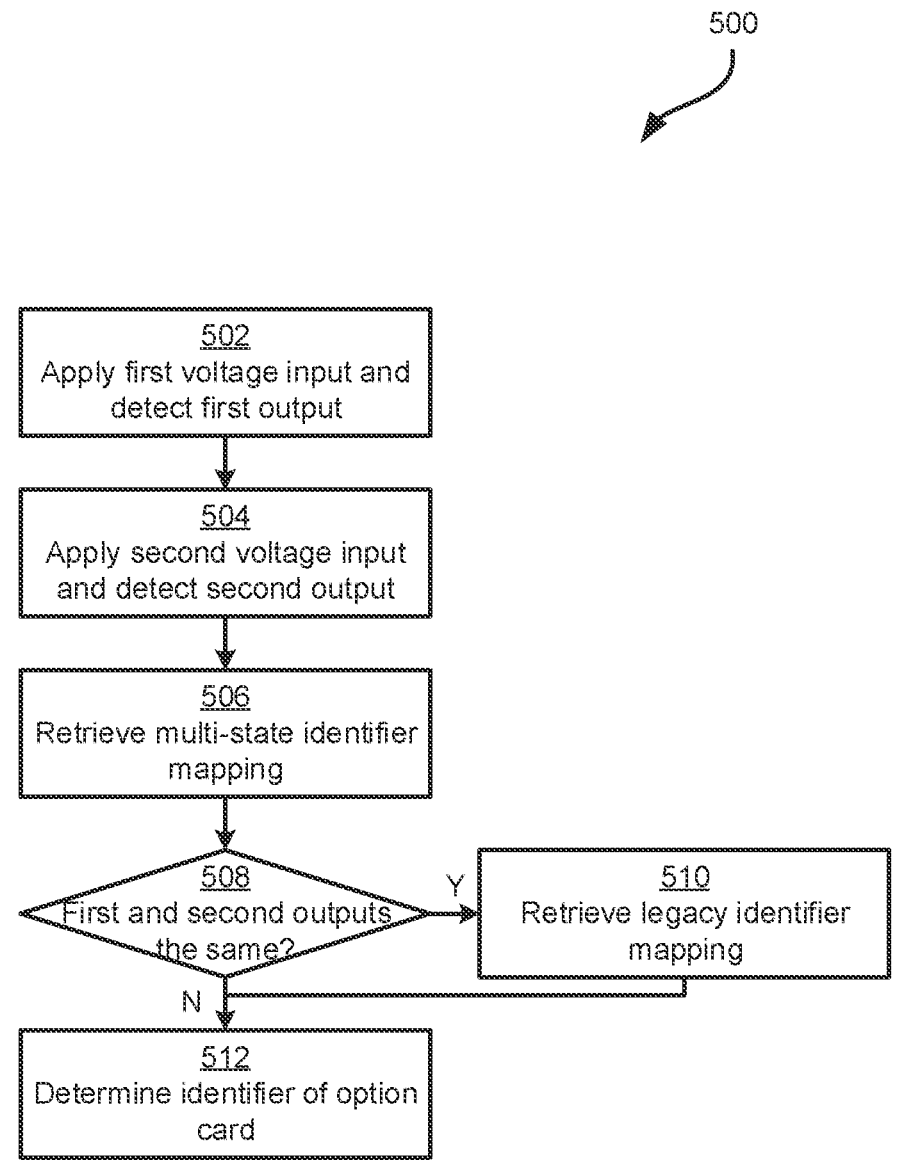
FIG. 5 is a flowchart of an example method of identifying option cards using multiple voltage inputs.

Referring to FIG. 5, an example method 500 of identifying an option card using multiple power state inputs is depicted. The method 500 will be described in conjunction with its performance by the computing device 100, with reference to the components described in FIGS. 1 and 2. In other examples, the method 500 may be performed by other suitable devices and/or systems.

At block 502, the controller 104 of the computing device 100 applies a first voltage input to the option card 106 in the option card receptacle 102. In particular, the controller 104 may apply the first voltage input via the input interface to the input pin 200 of the option card 106. The first voltage input may correspond to a first power state of the computing device 100. For example, the first power state may be a sleep state, and hence the first voltage input may have a relatively low magnitude. In some examples, the controller 104 may periodically sample the output from the option card 106 while the computing device 100 is in the sleep state.

Additionally, at block 502, the controller 104 detects a first output of the option card 106 as a result of the application of the first voltage input. In particular, the controller 104 may detect the first output via the output interface to the output pin 202 of the option card 106. The first output may represent, for example, a voltage value, or magnitude of a voltage step output from the circuit 204. Upon receipt of an analog voltage output from the output pin 202, the controller 104 may convert the analog voltage to a digital value for further processing.

At block 504, the controller 104 applies a second voltage input to the option card 106 in the option card receptacle 102. In particular, the controller 104 may apply the second voltage input via the input interface to the input pin 200 of the option card 106. The second voltage input may correspond to a second power state of the computing device 100. In particular, the performance of block 504 may be initiated when the computing device 100 transitions from the first power state to the second power state. For example, the second power state may be a power-on state, and hence the application of the second voltage input by the controller 104 may be performed in response to the computing device 100 being powered on. Further, the second voltage input may have a relatively high magnitude corresponding with signals associated with the power-on state.

Additionally, at block 504, the controller 104 detects a second output of the option card 106 as a result of the application of the second voltage input. In particular, the controller 104 may detect the second output via the output interface to the output pin 202 of the option card 106. The second output may represent, for example, a voltage value, or a magnitude of a voltage step output from the circuit 204.

In some examples, the computing device 100 may additionally include a resistor which provides a pull down signal to the controller 104 to allow the controller 104 to still receive a signal and when no option card is present in the option card receptacle 102. This resistor contributes to the resistor divider of the option card 106, and hence may be considered when considering the first and second outputs at blocks 502 and 504.

At block 506, the controller 104 retrieves a multi-state identifier mapping (e.g., from a memory) to determine the identifier of the option card 106. In particular, the multi-state identifier mapping may include associations between the combinations of possible first and second outputs with an identifier of the option card 106.

For example, the first and second outputs may represent voltage steps output from the circuit 204. To account for minor variances in the output based on imperfections in circuit construction, nearby components causing minor interference, or the like, the multi-state identifier mapping may define ranges for the outputs in the first power state and the second power state, and associate said ranges to the option card identifier. For example, Table 1 shows an example multi-state identifier mapping.

TABLE 1

| | Multi-state identifier mapping | | | |
| --- | --- | --- | --- | --- |
| | Power-on state (S0) | | Sleep State (S5) | |
| Option Card Identifier | S0 step min [Hex] | S0 step max [Hex] | S5 step min [Hex] | S5 step max [Hex] |
| No card | 000 | 007 | 000 | 007 |
| 1 | 008 | 012 | 008 | 012 |
| 2 | 013 | 01E | 008 | 012 |
| 3 | 01F | 02B | 008 | 012 |
| . . . | . . . | . . . | . . . | . . . |
| 14 | 013 | 01E | 013 | 01E |
| 15 | 01F | 02B | 013 | 01E |
| 16 | 02C | 032 | 013 | 01E |
| . . . | . . . | . . . | . . . | . . . |

In the above table, a range of magnitudes for the voltage step detected in each of the power states (power-on state or S0 and sleep state or S5) is defined. Each combination of ranges is associated with an option card identifier.

At block 508, the controller 104 determines whether the first output and the second output are substantially the same. That is, the controller 104 may determine whether the first output and the second output both fall within the same range as defined in the multi-state identifier mapping. Option cards built in accordance with the present description include a circuit with an output that varies based on the voltage input. Accordingly, the first output and the second output will differ between the first voltage input and the second voltage input based on the differences of the voltage inputs applied in the first power state and the second power state. In contrast, legacy option cards have a circuit which produces the same output irrespective of the voltage input. Accordingly, the first output and the second output will be substantially the same for both the first voltage input and the second voltage input.

If, at block 508, the controller 104 determines that the first output and the second output are not the same, the method 500 proceeds to block 512, as described below.

If, at block 508, the controller 104 determines that the first output and the second output are substantially the same (i.e., that the first output and the second output both fall within the same one of the predefined ranges of the multi-state identifier mapping), the method 500 proceeds to block 510. In some examples, certain rows of the multi-state identifier mapping (i.e., rows which for which the ranges for the first power state and the second power state are the same) may be flagged to cause the method 500 to proceed to block 510.

At block 510, the controller 104 retrieves a legacy identifier mapping (e.g., from a memory) to determine the identifier of the option card 106. In particular, the legacy identifier mapping may include a further of the multi-state identifier of the option card 106 with a legacy identifier of the option card 106. For example, Table 2 shows an example legacy identifier mapping.

TABLE 2

| | | Legacy identifier mapping | | | |
| --- | --- | --- | --- | --- | --- |
| | | Power-on State (S0) | | Sleep State (S5) | |
| Option Card Identifier (legacy) | Option Card Identifier (multi-state) | S0 step min [Hex] | S0 step max [Hex] | S5 step min [Hex] | S5 step max [Hex] |
| 1 | No card | 000 | 007 | 000 | 007 |
| 2 | 1 | 008 | 012 | 008 | 012 |
| 3 | 14 | 013 | 01E | 013 | 01E |
| . . . | . . . | . . . | . . . | . . . | . . . |

In the above table, a range of magnitudes for the voltage step detected in each of the power states (power-on state or S0 and sleep state or S5) is defined and is the same range for both power states. Further, each range corresponds to a multi-state option card identifier as well as a legacy option card identifier.

At block 512, the controller 104 determines the identifier of the option card 106 based on the mapping(s) retrieved at blocks 506 and 510. In particular, the controller 104 may identify a first range of the predefined ranges (i.e., defined in the mapping(s) retrieved at block 506 and/or 510) in which the first output falls, and a second range of the predefined ranges in which the second output falls.

For example, the controller 104 may simply use the multi-state identifier mapping to identify the row having the first and second ranges select the corresponding option card identifier as the identifier of the option card 106. In particular, the controller 104 may use the multi-state identifier mapping when the first range and the second range are different.

In some examples, when the first range and the second range are the same, after identifying the multi-state option card identifier, the controller 104 may additionally use the legacy identifier mapping to identify the legacy option card identifier corresponding to the multi-state option card identifier and select the legacy option card identifier as the identifier of the option card 106. In other examples, when the first range and the second range are the same, rather than identifying the multi-state option card identifier, the controller 104 may use the legacy identifier mapping to identify the row having the range in which the first output and the second output fall and select the corresponding legacy option card identifier as the identifier of the option card 106.

As described above, example computing devices and option cards may allow for the number of option card identifiers transmitted by a single option card pin to be expanded by using multiple voltage inputs and using a combination of the multiple corresponding outputs to determine the identifier of the option card. The option cards may include a circuit which, in addition to the traditional two resistors forming the resistor divider from which the identifier is obtained, also includes a third resistor. The third resistor is conditionally included in series and forms part of the resistor divider based on the voltage input. Hence, at a first voltage input, the resistor divider does not include the third resistor and results in a first output, and at a second voltage input, the resistor divider does include the third resistor and results in a second output.

To provide the different input voltages, the computing device may apply the first input voltage when it is in a first power state (e.g., sleep state) and the second input voltage when it is in a second power state (e.g., power on state). By using the combination of voltages in each of the states, more identifiers may be communicated on a single pin. Additionally, the option card circuitry structure and computing device readings allow backwards compatibility with option cards without the new resistors. In particular, legacy option cards do not produce outputs which are conditional upon high or low voltage inputs; rather, they produce the same output regardless of input. Accordingly, if the computing device detects that the outputs are different, it may use a multi-state identifier mapping to determine the identifier of the option card, while if the outputs are the same, it may use a legacy identifier mapping to determine the identifier of the option card.

The scope of the claims should not be limited by the above examples, but should be given the broadest interpretation consistent with the description as a whole.

The invention claimed is:

1. A computing device comprising:
an option card receptacle to receive an option card;
a controller interconnected with the option card receptacle, the controller to:
apply a first voltage input to the option card in the option card receptacle and detect a first output value from the option card;
apply a second voltage input to the option card in the option card receptacle and detect a second output value from the option card, wherein the second voltage is distinct from the first voltage;
determine an identifier of the option card based on a combination of the first output value and the second output value; and
based on the identifier of the option card, configure the option card for the computing device.

2. The computing device of claim 1, wherein the first voltage input is applied to the option card when the computing device is in a first power state, and the second voltage input is applied to the option card when the computing device is in a second power state.

3. The computing device of claim 2, wherein the first power state comprises a sleep state and the second power state comprises a power-on state.

4. The computing device of claim 1, wherein the controller is to detect the first output value and the second output value at an analog-to-digital converter pin detecting first voltage values and second voltage values, respectively, output values from the option card.

5. The computing device of claim 1, wherein the controller is to retrieve a multi-state identifier mapping to determine the identifier of the option card when the first output value and the second output value are different.

6. The computing device of claim 1, wherein the controller is to retrieve a legacy identifier mapping to determine the identifier of the option card when the first output value and the second output value are the same.

7. A computing device comprising:
an option card receptacle to receive an option card;
a controller interconnected with the option card receptacle, the controller to:
apply a first voltage input to the option card in the option card receptacle when the computing device is in a first power state and detect a first output value from the option card;
in response to the computing device transitioning to a second power state, apply a second voltage input to the option card in the option card receptacle and detect a second output value from the option card, wherein the second voltage is distinct from the first voltage;
determine an identifier of the option card based on a combination of the first output value and the second output value; and
based on the identifier of the option card, configure the option card for the computing device.

8. The computing device of claim 7, wherein the first and second output values represent voltage steps output from the option card.

9. The computing device of claim 7, wherein to determine the identifier, the controller is to:
identify a first range of a plurality of predefined ranges in which the first output value fails;
identify a second range of the plurality of predefined ranges in which the second output value fails; and
select an option card identifier corresponding to the first range and the second range as the identifier of the option card.

10. The computing device of claim 9, wherein the controller is to:
use a multi-state identifier mapping to select a multi-state option card identifier as the identifier of the option card when the first range and the second range are different; and
use a legacy identifier mapping to select a legacy option card identifier as the identifier of the option card when the first range and the second range are the same.

* * * * *